June 29, 1943.  R. M. HEINTZ ET AL  2,323,135
HAND CRANK MECHANISM
Filed Feb. 21, 1942  2 Sheets-Sheet 1

INVENTORS.
RALPH M. HEINTZ
PHILIP F. SCOFIELD
BY Frank H. Harmon
ATTORNEY

INVENTORS.
RALPH M. HEINTZ
PHILIP F. SCOFIELD

BY Frank H Harmon
ATTORNEY

Patented June 29, 1943

2,323,135

UNITED STATES PATENT OFFICE 2,323,135

HAND CRANK MECHANISM

Ralph M. Heintz, Cleveland, and Philip F. Scofield, Cleveland Heights, Ohio, assignors to Jack & Heintz, Inc., Bedford, Ohio Application February 21, 1942, Serial No. 431,850

3 Claims. (Cl. 74—414)

This invention relates to an improved hand crank mechanism, and has particular reference to a hand crank mechanism including a portable or removable gear box for use with inertia starters associated with the engines of vehicles such as aircraft and the like.

The general object of the invention is to provide an improved hand cranking mechanism employing a detachable crank and gear box for imparting high speed rotation to a shaft.

A further object is to provide a lightweight and compact gearing unit which may be applied to a vehicle in order to establish operative connection between a hand crank and equipment contained within the vehicle to be driven thereby.

A particular object is to provide a portable crank and gear box which may be externally applied to a vehicle containing an internal combustion engine in order to effect the high speed rotation of an inertia type starter to start said engine.

A still further object is to provide a novel and improved arrangement of parts for detachably supporting a portable gear box in operative relation with a shaft to be driven thereby.

Additional objects and advantages will appear as the description proceeds in connection with the accompanying drawings in which.

Figure 1:
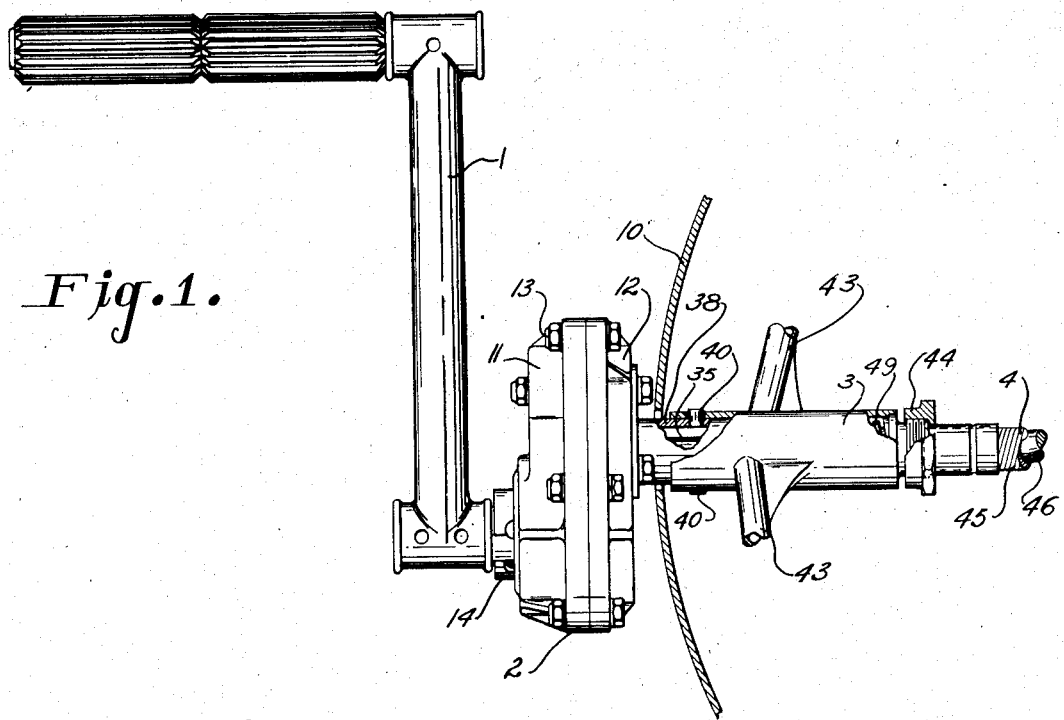
Fig. 1 illustrates the component parts of the present invention in combination as they may be applied to a vehicle or the like for imparting high speed rotation to a shaft within the vehicle.
Figure 2:
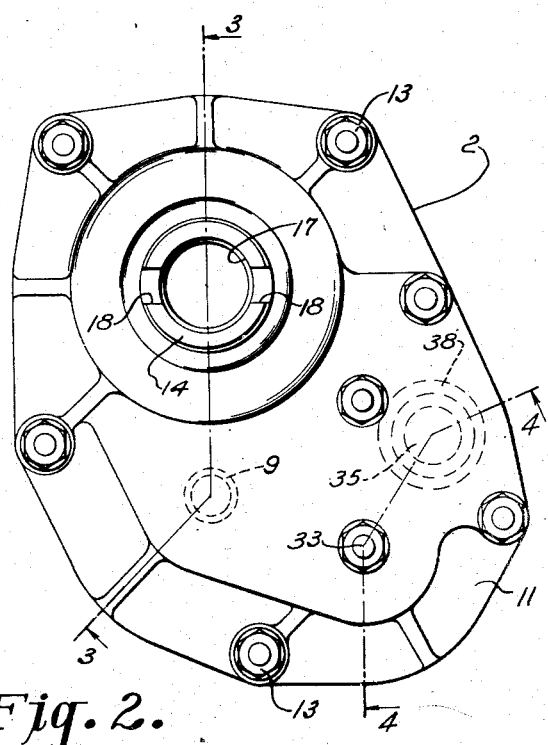
Fig. 2 is an elevation view of the gear box, looking at the crank side.
Figure 3:
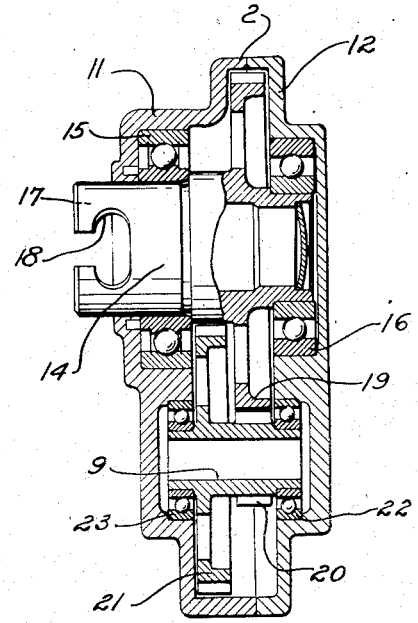
Fig. 3 is a sectional view through the gear box, taken on the line 3—3 of Fig. 2.

This invention is particularly adapted for the hand cranking of inertia starters on the engines of airplanes or other vehicles. The type of inertia starter referred to employs a flywheel adapted to be rotated at a very high speed, and to obtain such high speed rotation by hand cranking means it is necessary that one or more gear trains or the like be interposed between the crank and the flywheel. Since the location of the hand crank on the vehicle is usually at some distance from the inertia flywheel, a length of shafting is ordinarily required; and in order to reduce the weight of the parts, it is desirable to transmit the necessary energy through such shafting at rather high rotational speeds so that the torque, and consequently the strength requirements, may be proportionately lessened. Even though there may be a gear train associated with the inertia flywheel itself, it is still desirable to provide a reduction gear unit adjacent the crank. The invention therefore involves the use of such a reduction gear unit in the form of a portable gear box associated with a hand crank which combination may be applied to the end of the shaft driving the inertia wheel at such times as it may be come necessary to use a hand crank for starting.

The component parts of the present invention, therefore, comprise generally a hand crank 1; a portable gear box 2, and a supporting sleeve 3 carrying the end of the shaft 4 which drives the inertia flywheel. The housing of the gear box 2 is made in two parts, 11 and 12, held together by a plurality of bolts 13 passing through hollow dowels. A stub shaft 14, mounted in bearings 15 and 16, is provided with a socket 17 and bayonet slots 18 to receive a conventional hand crank 1. The stub shaft 14 carries a large gear 19 which drives a smaller gear 20. The smaller gear 20 is integral with a large gear 21 on a hollow shaft 9 carried in bearings 22 and 23 as shown. The gear 21 drives a second smaller gear 24 integral with a large gear 25 on a hollow shaft 28, this shaft being mounted in bearings 26, 27.

It may be pointed out that the shafts 9 and 14 have one bearing in the housing part 11 and another bearing in the housing part 12. In the case of the shaft 28, which turns relatively fast with respect to the speed of rotation of the hand crank, it is important that the accurate alignment and spacing of bearings 26 and 27 be maintained at all times, and means will now be described to prevent the disturbing of this alignment and spacing when the parts of the housing are subjected to bending and other stresses incident to the hand cranking operation. Through the opening in the shaft 28 is inserted a hollow pillar 30 having ends 31 and 32 bearing against surfaces on the housing parts 11 and 12. A bolt 33 is passed through the hollow pillar 30 and rigidly clamps the two parts 11 and 12 against the opposite end of the pillar. By virtue of this construction, distortion of the parts 11 and 12 cannot affect the alignment or spacing of the bearings 26 and 27.

The large gear 25 drives a smaller gear 34 on a so-called driving member or power take-off shaft 35. The shaft 35 is mounted in bearings 36 and 37 in a tubular shank 38 carried by and extending from the housing parts 11 and 12 in the manner shown. An opening 8 in the shank 38 admits the gear 25 into driving engagement with the gear 34. In order to cooperate with structure to be presently described, shaft 35 is provided at its driving end with a squared hole 39, and the tubular shank 38 is provided with pins 40.

The shaft 35 revolves faster than the shaft 28, and hence it is even more important to accurately preserve the correct axial alignment and spacing of the bearings 36 and 37, than in the case of bearings 26 and 27. The mounting of the bearings 36 and 37 in the rigid tubular shank 38 protects them from the possible effects of distortion of the housing parts 11 and 12. Also, the mounting of the bearing 36 in the tubular shank 38, beyond the housing part 12, reduces the length of the free end of the shaft 35.

The supporting sleeve 3 is provided with bayonet slots 41 in a socket end 42. The socket 42 is adapted to receive the shank 38 therewithin with the pins 40 in engagement with the slots 41 so as to thereby bodily support the gear box 2. The sleeve 3 is made an integral part of the airplane 10 or other vehicle by welded connection with supporting struts 43, which may be welded at their other ends to a part of the airplane structure or engine mount (not shown).

Figure 4:
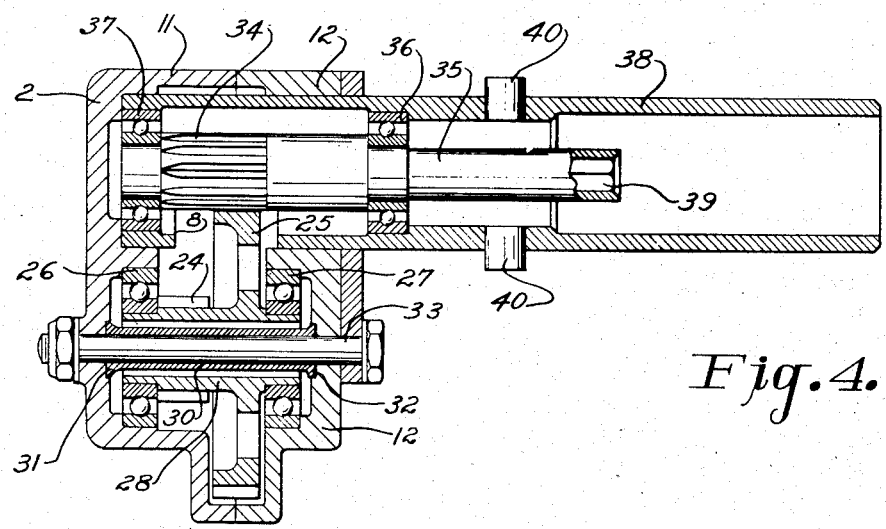
Fig. 4 is a sectional view through the gear box, taken on the line 4—4 of Fig. 2.
Figure 6:
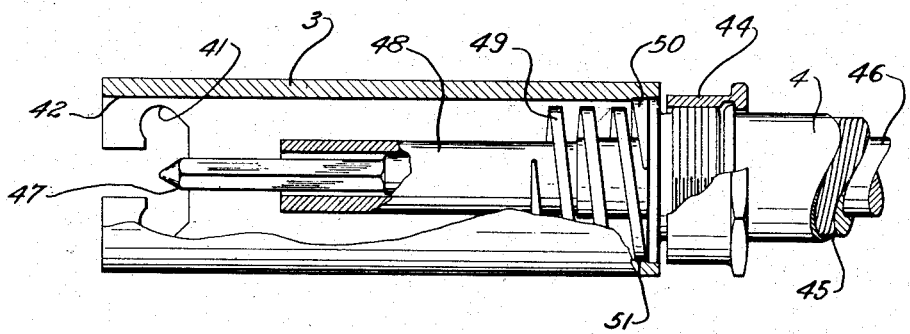
Fig. 6 is a view, partially in section, of the supporting sleeve for holding the gear box in operative relation with the shaft to be driven thereby.
Figure 5:
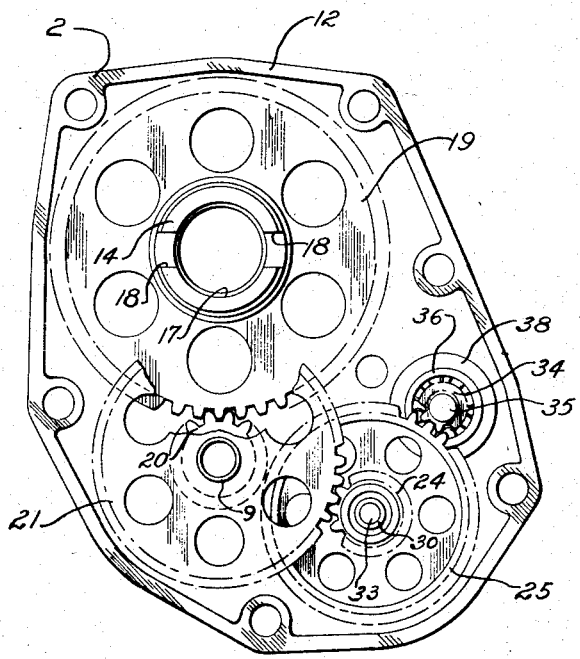
Fig. 5 is an interior view of the gear box showing the relation of the various components of the gear train.

In the illustrated embodiment, the sleeve 3, shown in Fig. 4 without the supporting struts 43, is provided with a screw threaded member 44 for anchoring the end of a shaft housing 45. The shaft heretofore referred to generally by the reference numeral 4 comprises in the present embodiment the housing 45 and the flexible shaft 46. Shaft 46 extends into the sleeve 3 and into the socket portion 42 so as to be in a position to establish operative connection with the driving shaft 35 when the shank 38 is seated in the socket. Sleeve 3 carries a guide bushing 48 to position the squared end 47 of the shaft 46 in alignment with the squared hole 39. A spring 49 is provided to bear against the end of the tubular shank 38 and seat the pins 40 in the bayonet slots 41. The spring 49 may be retained in place in the sleeve 3 by expanding the last turn 50 so as to closely fit the bore of the sleeve and a shallow annular groove 51 may be provided in the sleeve, if desired, to receive the expanded turn 50. By virtue of the above described construction and arrangement of parts associated with the sleeve 3, those parts which would be damaged by high temperature may be removed during the welding of the sleeve to the struts 43.

The present invention provides for the transmission of the cranking effort to the shaft 46, and at relatively high speed in comparison with the rotational speed of the crank in order to impart a high speed rotation to the flywheel of an inertia starter (not shown). Crank 1 and gear box 2 are intended to be applied to the socket 42 only for the starting operation, and may thereafter be removed and stowed in the airplane or vehicle, the same crank and gear box being used for all starters on the airplane. During the starting operation the sleeve 3 bodily supports the crank and gear box combination so that the crank may have considerable force applied thereto to accelerate the inertia flywheel. The supporting sleeve 3 may be located for the greatest convenience and accessibility in the type of vehicle under consideration and may provide for cranking either from the outside or inside of the vehicle, the shaft 4 extending from the location of the crank to the engine starting device.

While I have shown and described but a single embodiment of my invention, it is to be understood that it is capable of many modifications. Changes, therefore, in the construction and arrangement may be made which do not depart from the spirit and scope of the invention as defined in the appended claims.

We claim:

1. A portable gear box comprising a two-part housing, a crank-receiving stub shaft in said housing, a gear train in said housing, an elongated tubular shank carried jointly by the two parts of said housing and extending therefrom for supporting said gear box on a mechanism to be driven thereby, spaced anti-friction bearings in said shank, and a power take-off shaft in said bearings driven by said stub shaft through said gear train, said power take-off shaft being contained within said shank and said shank having elements of a quick-detachable connecting means thereon.

2. A portable gear box comprising a two-part housing, a crank-receiving stub shaft having a bearing in each of said parts, a gear train in said housing, each intermediate gear in said train having a bearing in each of said parts, a tubular shank carried by said two parts and extending from said housing for supporting said gear box on a mechanism to be driven thereby, a bearing in said shank within said housing, a bearing in that part of said shank extending from said housing, a power take-off shaft within said shank and carried by said last-named bearings, a gear on said power take-off shaft, and an opening in said shank adjacent said last-mentioned gear through which said power take-off shaft is driven by said gear train.

3. A portable gear box comprising a two-part housing, a crank-receiving stub shaft having a bearing in each of said parts, a gear train in said housing, each intermediate gear in said train having a bearing in each of said parts, a tubular shank carried by said two parts and extending from said housing for supporting said gear box on a mechanism to be driven thereby, a bearing in said shank within said housing, a bearing in that part of said shank extending from said housing, a power take-off shaft within said shank and carried by said last-named bearings, a gear on said power take-off shaft, an opening in said shank adjacent said last-mentioned gear, a gear in said gear train driving said gear on said power take-off shaft through said opening, said gear in said gear train being carried on a hollow shaft, a hollow pillar through said hollow shaft and abutting inside surfaces on the two parts of said housing, and a bolt through said hollow pillar clamping the two parts of said housing together and against the ends of said pillar.

RALPH M. HEINTZ.
PHILIP F. SCOFIELD.